United States Patent
Lin et al.

(10) Patent No.: US 10,018,865 B2
(45) Date of Patent: Jul. 10, 2018

(54) ARRAY SUBSTRATE AND LIQUID CRYSTAL DISPLAY APPARATUS

(71) Applicants: BOE TECHNOLOGY GROUP CO., LTD., Beijing (CN); BEIJING BOE DISPLAY TECHNOLOGY CO., LTD., Beijing (CN)

(72) Inventors: Lifeng Lin, Beijing (CN); Hongming Zhan, Beijing (CN); Yongcan Wang, Beijing (CN)

(73) Assignees: BOE TECHNOLOGY GROUP CO., LTD., Beijing (CN); BEIJING BOE DISPLAY TECHNOLOGY CO., LTD., Beijing (CN)

(*) Notice: Subject to any disclaimer, the term of this patent is extended or adjusted under 35 U.S.C. 154(b) by 337 days.

(21) Appl. No.: 14/778,814

(22) PCT Filed: Dec. 17, 2014

(86) PCT No.: PCT/CN2014/094108
§ 371 (c)(1),
(2) Date: Sep. 21, 2015

(87) PCT Pub. No.: WO2016/037437
PCT Pub. Date: Mar. 17, 2016

(65) Prior Publication Data
US 2016/0306223 A1    Oct. 20, 2016

(30) Foreign Application Priority Data
Sep. 9, 2014 (CN) .......................... 2014 1 0455895

(51) Int. Cl.
*G02F 1/1333* (2006.01)
*G02F 1/1343* (2006.01)
(Continued)

(52) U.S. Cl.
CPC .... *G02F 1/133382* (2013.01); *G02F 1/13439* (2013.01); *G02F 1/133707* (2013.01); *G02F 1/134309* (2013.01); *G02F 1/133615* (2013.01)

(58) Field of Classification Search
CPC ......... G02F 1/133707; G02F 1/133615; G02F 1/134309; G02F 1/13439
See application file for complete search history.

(56) References Cited

U.S. PATENT DOCUMENTS

2002/0012084 A1*   1/2002   Yoon ................. G02F 1/133707
                                                         349/108
2003/0086045 A1    5/2003   Ono et al.
(Continued)

FOREIGN PATENT DOCUMENTS

CN        1491371 A      4/2004
CN      102155674 A      8/2011
(Continued)

OTHER PUBLICATIONS

First Chinese Office Action dated Jun. 8, 2016; Appln. No. 201410455895.8.
(Continued)

*Primary Examiner* — Elmito Breval
(74) *Attorney, Agent, or Firm* — Ladas & Parry LLP

(57) ABSTRACT

An array substrate and a liquid crystal display apparatus are disclosed. The array substrate includes a substrate and a first electrode formed on the substrate. The array substrate includes a first side and a second side that is opposite to the first side. The first electrode includes multiple pixels and each pixel includes multiple slits. A slit width of at least one slit close to the second side and an inter-slit distance between the at least one slit and another slit adjacent to the at least one slit are greater than a slit width of a first slit close to the first side and an inter-slit distance between the first slit and another slit adjacent to the first slit, respectively. The
(Continued)

liquid crystal display apparatus has uniform grayscale in different positions from the first side close to the backlight source to the second side opposite to the first side.

19 Claims, 5 Drawing Sheets

(51) Int. Cl.
  *G02F 1/1337* (2006.01)
  *G02F 1/1335* (2006.01)

(56) References Cited

U.S. PATENT DOCUMENTS

| | | |
|---|---|---|
| 2003/0095223 A1 | 5/2003 | Song |
| 2006/0274241 A1 | 12/2006 | Maeda et al. |
| 2011/0141551 A1 | 6/2011 | Uchida et al. |
| 2012/0026440 A1* | 2/2012 | Suwa ................ G02F 1/133711 349/123 |
| 2012/0182511 A1 | 7/2012 | Hisada et al. |
| 2014/0076615 A1* | 3/2014 | Gao .................. G02F 1/133707 174/253 |
| 2017/0038647 A1* | 2/2017 | Wang ................ G02F 1/134327 |

FOREIGN PATENT DOCUMENTS

| | | |
|---|---|---|
| CN | 102937763 A | 2/2013 |
| CN | 103969897 A | 8/2014 |
| JP | 2003-140188 A | 5/2003 |

OTHER PUBLICATIONS

International Search Report and Written Opinion both dated Jun. 16, 2015; PCT/CN2014/094108.

Second Chinese Office Action dated Feb. 3, 2017; Appln. No. 201410455895.8.

* cited by examiner

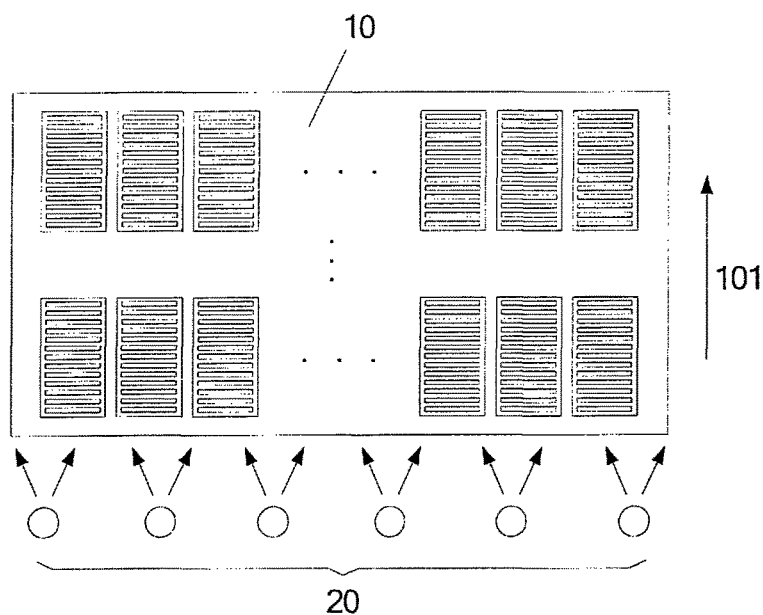
FIG.1
| Temperature | 20°C | 25°C | 40°C | 50°C |
|---|---|---|---|---|
| Liquid Crystal Light Efficiency (7.9V) | 100% | 99.6% | 97.8% | 94.4% |
FIG.2
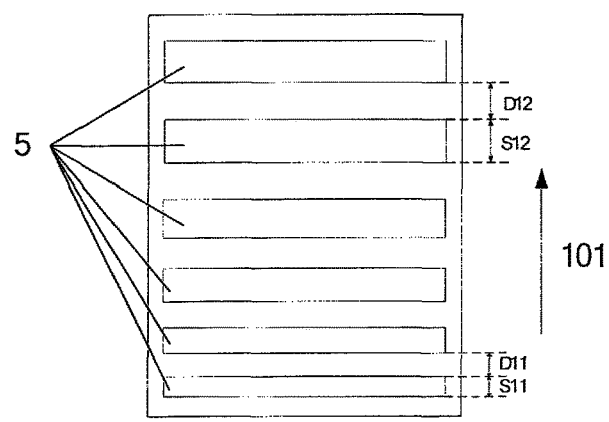
FIG.3

ARRAY SUBSTRATE AND LIQUID CRYSTAL DISPLAY APPARATUS

TECHNICAL FIELD

Embodiments of the present disclosure relate to an array substrate and a liquid crystal display apparatus.

BACKGROUND

As shown in FIG. 1, a liquid crystal display apparatus, e.g., an IPS (In Plane Switch) type liquid crystal display apparatus, includes a display panel 10 and a backlight source 20. The backlight sources 20 can be a light emitting source which is located on a side of the display panel 10 and includes a plurality of LEDs (Light Emitting Diodes). Multiple identical pixels are included along a light emitting direction 101 of the backlight source 20 on the array substrate.

The LEDs emit light and generate heat. A higher temperature in the LEDs may lead to more heat radiated from the LEDs. The longer the backlight source is turned on, the higher the local temperature is. A gradient temperature variation from high temperature to low temperature may be formed in the display panel from the side of LEDs to an opposite side along the light emitting direction 101. Thus, inconsistency in light efficiency of liquid crystal may occur in different positions from the side close to LEDs to the opposite side, because characteristics such as a refractive index and a dielectric constant of liquid crystal material may be affected by the temperature. For example, as shown in FIG. 2, as the temperature varies from 20☐ to 50☐, the light efficiency of the liquid crystal is decreased from 100% to 94.4% under the same driving voltage, causing non-uniform grayscale in different positions of the display panel from a side close to the backlight source to a side far from the backlight source.

SUMMARY

At least one embodiment of the disclosure provides an array substrate, which includes: a substrate and a first electrode formed on the substrate. The array substrate includes a first side and a second side that is opposite to the first side. The first electrode includes multiple pixels and each pixel includes multiple slits. A slit width of at least one slit that is close to the second side is greater than a slit width of a first slit that is close to the first side. An inter-slit distance between the at least one slit close to the second side and another slit that is adjacent to the at least one slit is greater than an inter-slit distance between the first slit close to the first side and another slit that is adjacent to the first slit.

Embodiments of the disclosure further provide a liquid crystal display apparatus, which includes a backlight source and the array substrate described above. The backlight source is arranged at a position close to the first side of the array substrate.

BRIEF DESCRIPTION OF THE DRAWINGS

In order to clearly illustrate the technical solution of the embodiments of the disclosure or the technical solution in prior art, the drawings of the embodiments or the drawings that is need when the prior art is described, will be briefly described in the following; it is obvious that the described drawings are only related to some embodiments of the disclosure and thus are not limitative of the disclosure.

FIG. 1 is a schematic diagram of an example display panel;

FIG. 2 is a graph that illustrates light efficiencies of liquid crystal under different temperatures;

FIG. 3 is a schematic diagram of a pixel provided in an embodiment of the disclosure;

FIG. 10b is a schematic diagram of a sectional view at A-A' of FIG. 10a.

NUMERICAL REFERENCES IN THE DRAWINGS

Figure 4:
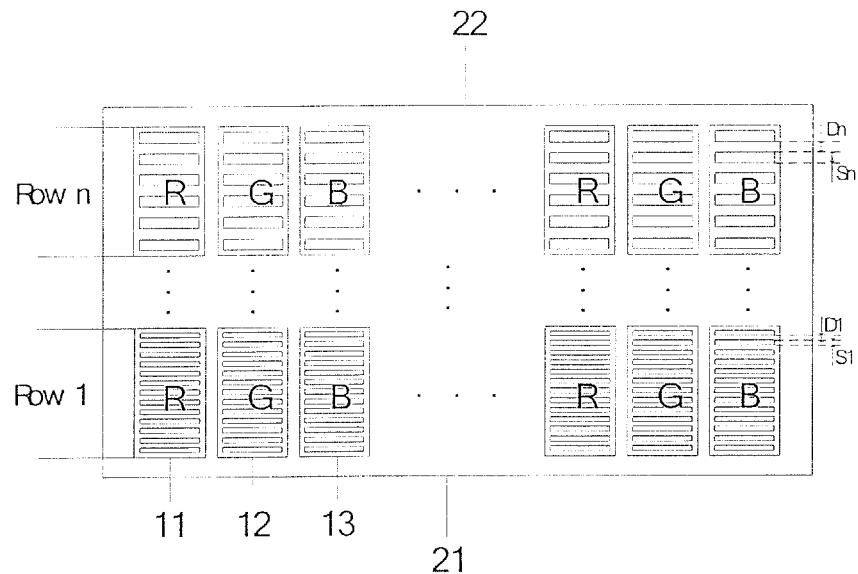
FIG. 4 is a schematic diagram of an array substrate provided in an embodiment of the disclosure.

1: first electrode; 2: second electrode; 3: substrate; 4: insulation layer, 5: slit; 10: display panel; 11: first pixel; 12: second pixel; 13: third pixel; 20: backlight source; 21: first side; and 22: second side.

DETAILED DESCRIPTION

The technical solutions of the embodiments of the disclosure will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Embodiments of the disclosure provide an array substrate, which includes: a substrate and a first electrode formed on the substrate. The array substrate includes a first side and a second side that is opposite to the first side. The first electrode includes multiple pixels and each pixel is configured to include multiple slits. A first slit width of at least one slit close to the second side and a first inter-slit distance between the at least one slit close to the second side and another slit adjacent to the at least one slit close to the second side are larger than a second slit width of a slit close to the first side and a second inter-slit distance between the slit close to the first side and another slit adjacent to the slit close to the first side, respectively.

It should be noted that, a slit width of at least one slit close to the second side and an inter-slit distance between the at least one slit close to the second side and another slit adjacent to the at least one slit close to the second side are larger than a slit width of a slit close to the first side and an inter-slit distance between the slit close to the first side and another slit adjacent to the slit close to the first side, respectively. In other words, the slit width of the at least one slit that is close to the second side is greater than the slit width of the slit that is close to the first side, and the inter-slit distance between the at least one slit close to the second side and another slit that is adjacent to the at least one slit is greater than an inter-slit distance between the slit close to the first side and another slit that is adjacent to the slit close to the first side.

It should be noted that, the slit close to the first side and the slit close to the second side can be located in a same pixel, and can also be located in different pixels. FIG. 3 illustrates slits located in a same pixel. For example, as shown in FIG. 3, a direction 101 extends from a first side 21 to a second side 22, and multiple slits 5 are disposed in the same pixel. A slit width $S_{12}$ of at least one slit close to the second side 22 and an inter-slit distance $D_{12}$ between the at least one slit close to the second side 22 and another slit adjacent to the at least one slit close to the second side 22 are larger than a slit width $S_{11}$ of a slit close to the first side 21 and an inter-slit distance $D_{11}$ between the slit close to the first side 21 and another slit adjacent to the slit close to the first side 21, respectively. That is, as shown in FIG. 3, $S_{12}>S_{11}$ and $D_{12}>D_{11}$.

It should be noted that, as shown in FIG. 3, multiple slits 5 are configured in the pixel. A slit width of a slit can be equal to the width slit S12 as shown in FIG. 3 and an inter-slit distance between the slit and another slit adjacent to the slit can be equal to the distance $D_{12}$ as shown in FIG. 3. For a slit located in the middle of the pixel that has two corresponding inter-slit distances on two sides of the slit, a slit width of the slit located in the middle of the pixel and an inter-slit distance between the slit and another slit adjacent to the slit can be the slit width of the slit and an inter-slit distance between the slit and another adjacent slit on any of the two sides, respectively. Embodiments of the disclosure are described in details by using the slit width $S_{12}$ and the inter-slit distance $D_{12}$ as examples. In addition, the array substrate includes a first side and a second side, where the first side and the second side are opposite to each other. For example, the first side and the second side can be the first side 21 and the second side 22 shown in FIG. 4; alternatively, the first side and the second side can be the first side 21 and the second side 22 shown in FIG. 7.

Figure 8:
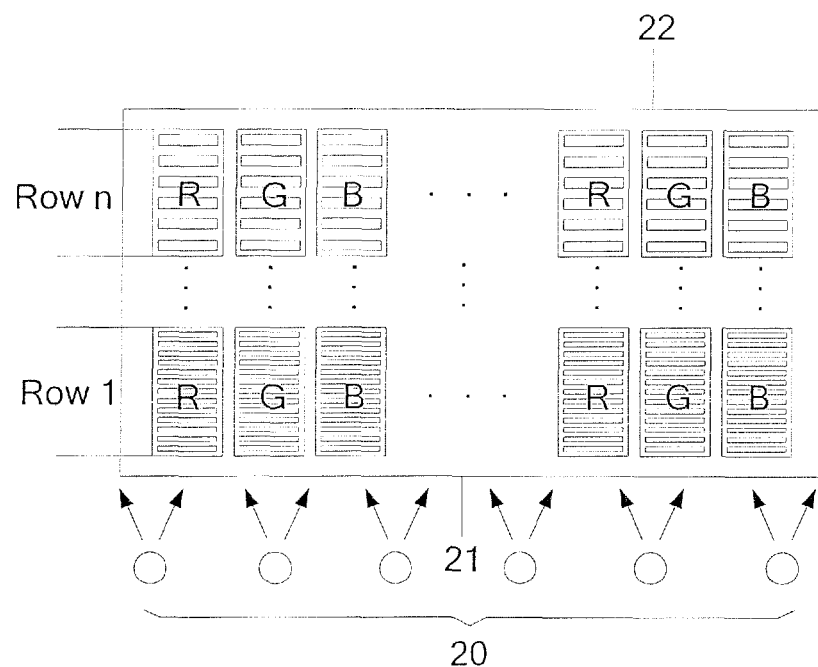
FIG. 8 is a schematic diagram of a display apparatus provided in an embodiment of the disclosure.

It should be noted that as shown in FIG. 8, the first side can be understood as a side which is close to the backlight source 20, and the second side can be understood as a side which is away from the backlight source 20.

Figure 5:
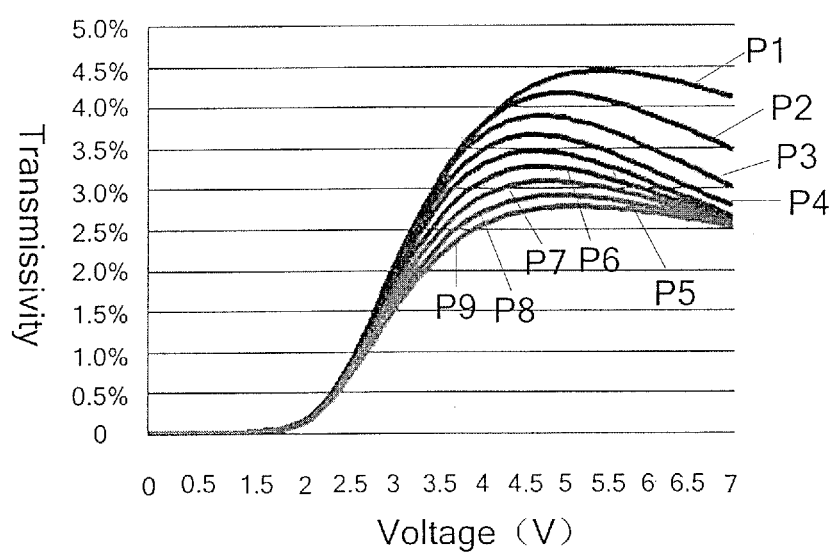
FIG. 5 is a graph depicting curves that illustrate relationships between voltages and transmissivity for different electrode cycles provided in an embodiment of the disclosure.
Figure 6:
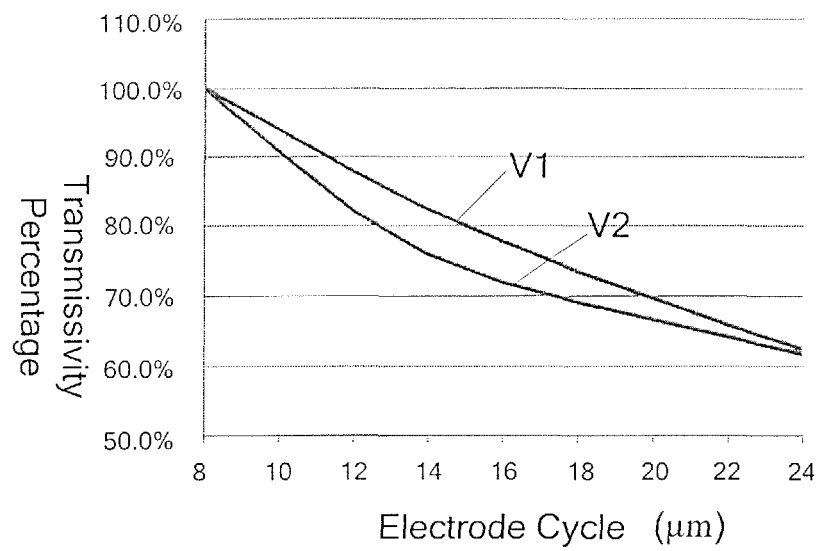
FIG. 6 is a graph depicting curves that illustrate relationships between electrode cycles and transmissivity for different voltages provided in an embodiment of the disclosure.

Simulation results which are obtained with software simulation tests by inventors of the application are shown in FIGS. 5 and 6. FIG. 5 is a graph depicting curves of transmissivity versus various voltages under different electrode cycles P (P=S+D, that is, an electrode cycle is equal to the sum of a slit width of a slit and an inter-slit distance between the slit and another slit adjacent to the slit), where P1 is 8 μm, P2 is 10 μm, P3 is 12 μm, P4 is 14 μm, P5 is 16 μm, P6 is 18 μm, P7 is 20 μm, P8 is 22 μm, and P9 is 24 μm. It can be seen from FIG. 5 that in a certain voltage range, the longer the electrode cycle is, the smaller the transmissivity is. For each different electrode cycle, the corresponding transmissivity achieves its maximal value when the voltage is a corresponding voltage Vtop. The horizontal coordinate of FIG. 6 represents the electrode cycle, and the vertical coordinate of FIG. 6 represents a transmissivity percentage relative to a maximal transmissivity from a curve when P1 is 8 μm in FIG. 5. The curves in FIG. 6 are respective transmissivity curves that vary according to changes in the electrode cycle, where the transmissivity curves are respectively related to a voltage V1 (that is, Vtop) that corresponds to a maximal transmissivity and a voltage V2 (which is the voltage value corresponding to the maximal transmissivity in the scenario when P1 is 8 μm as shown in FIG. 5). It can be seen from FIG. 6 that the larger the electrode cycle is, the smaller the transmissivity is.

It should be noted that an electrode cycle is equal to the sum of a slit width of a slit and an inter-slit distance between the slit and another slit adjacent to the slit, and the phrase "the larger the electrode cycle is" mentioned above also refers to both of the slit width of the slit and the inter-slit distance between the slit and the other slit adjacent to the slit are larger. For example, if P2 is larger than P1, a slit width of a first slit in a first pixel corresponding to P1 and an inter-slit distance that is between the first slit and another slit adjacent to the first slit are respectively larger than a slit width of a second slit in a second pixel corresponding to P2 and an inter-slit distance that is between the second slit and another slit adjacent to the second slit.

Therefore, according to embodiments of the disclosure, a slit width of at least one slit close to the second side and an inter-slit distance between the at least one slit close to the second side and another slit adjacent to the at least one slit close to the second side are respectively larger than a slit width of a slit close to the first side and an inter-slit distance between the slit close to the first side and another slit adjacent to the slit close to the first side. That is, when a backlight source is disposed on the first side, a slit width of a slit close to a first area on the first side that has a high temperature and an-inter distance between the slit close to the first area and another slit adjacent to the slit close to the first area are small, while a slit width of a slit close to a second area on the second side that has a low temperature and an inter-slit distance between the slit close to the second area and another slit adjacent to the slit close to the second area are large. And, a larger slit width of the slit and a larger inter-slit distance between the slit and anther slit adjacent to the slit may lead to a smaller transmissivity. As a result, a problem that includes a gradient increase in difference of the liquid crystal light efficiencies caused by a gradient decrease of temperature from the first side to the second side of the backlight source is compensated, and therefore uniformity of image grayscale in the display apparatus is improved.

For example, for multiple pixels, a ratio of a slit width of each slit and an inter-slit distance between each slit and another slit adjacent to the respective slit is a constant. In other words, a slit width of a first slit close to the second side is greater than a slit width of a second slit close to the first side, and an inter-slit distance that is between the first slit close to the second side and another slit adjacent to the first slit is greater than an inter-slit distance that is between the second slit close to the first side and another slit adjacent to the second slit; however, a ratio of the slit width of the first slit close to the second side and the inter-slit distance between the first slit close to the second side and the other slit adjacent to the first slit is equal to a ratio of the slit width of the second slit close to the first side and the inter-slit distance between the second slit close to the first side and the other slit adjacent to the second slit. As shown in FIG. 3, S12>S11 and D12>D11 on the array substrate, but S12:D12=S11:D11. In other examples, for each pixel on the array substrate, ratios of slit widths and inter-slit distances can be determined based on various factors such as different display requirements. The ratios can be any ratios that meet the display requirements, and no restriction is placed by embodiments of the disclosure.

For example, as shown in FIG. 4, multiple pixels are arranged in multiple rows from the first side 21 to the second side 22. FIG. 4 illustrates a first row and an $n^{th}$ row by way of examples, and other rows from the first row to the $n^{th}$ row can be illustrated with reference to the first row and the $n^{th}$ row. A plurality of pixels forms multiple rows with each row including multiple pixels. The arrangement with pixels being formed in multiple rows can facilitate formation of pixels on the array substrate.

For example, assume that a resolution of a display panel is 800*600 (i.e. the array substrate includes 800*600 pixels). Generally, pixels in the array substrate are arranged in an array. Thus, 600 rows of pixels are included from the first side to the second side on the array substrate and 800 pixels are included in each row of pixels. Alternatively, 800 rows of pixels are included from the first side to the second side on the array substrate and 600 pixels are included in each row of pixels.

For example, pixels located in a same row correspond to at least three different colors. As shown in FIG. 4, pixels located in the same row correspond to three different colors that include red (R), green (G) and blue (B). In some examples, pixels located in the same row can also correspond to four different colors that include red (R), green (G), blue (B) and white (W), or red (R), green (G), blue (B) and yellow (Y). By way of examples, embodiments of the disclosure and the accompanying drawings are described in terms of pixels located in the same row that correspond to three different colors including red (R), green (G) and blue (B). For example, as shown in FIG. 4, a first pixel 11 corresponds to red (R), a second pixel 12 corresponds to green (G), and a third pixel 13 correspond to blue (B).

Figure 7:
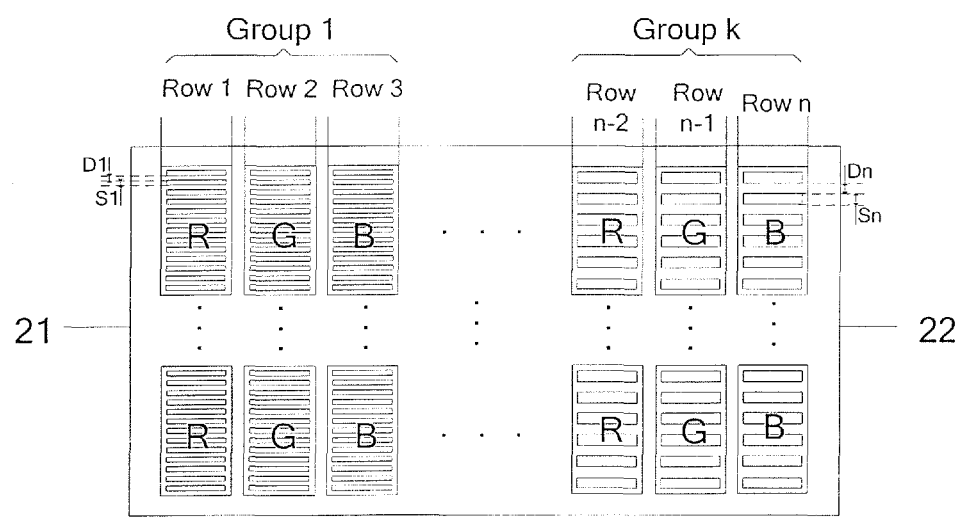
FIG. 7 is a schematic diagram of another array substrate provided in an embodiment of the disclosure.

Alternatively, pixels located in the same row can correspond to a same color. As shown in FIG. 7, all the pixels located in a first row correspond to red (R), all the pixels located in a second row correspond to green (G), and all the pixels located in a third row correspond to blue (B).

For example, for each pixel located in the same row, slit widths of slits in the corresponding pixel are increased sequentially from the first side to the second side, and inter-slit distances between the slits of the corresponding pixel and other slits which are respectively adjacent to the slits of the corresponding pixel are increased sequentially from the first side to the second side. In other words, the array substrate includes multiple rows of pixels from the first side to the second side; the slit widths of the slits in each of the pixels located in the same row are increased gradually from the first side to the second side; and the inter-slit distances between the slits in each of the pixels located in the same row and other slits which are respectively adjacent to the slits in each of the pixels located in the same row are increased gradually from the first side to the second side. As a result, for each pixel located in the same row, a problem which includes a gradient increase in differences of the liquid crystal light efficiencies caused by a gradient decrease of temperature from the first side to the second side due to a position of the backlight source is compensated. Therefore, uniformity of image grayscale in the display apparatus is improved.

For example, for each pixel located in the same row, the slit widths of the slits of the corresponding pixel are equal, and the inter-slit distances between the slits of the corresponding pixel and other slits which are respectively adjacent to the slits of the corresponding pixels are equal. Meanwhile, slit widths of first slits in one row of pixels close to the second side are greater than slit widths of second slits in one row of pixels close to the first side, and inter-slit distances between the first slits close to the second side and the other slits that are respectively adjacent to the first slits are greater than inter-slit distances between the second slits close to the first side and the other slits that are respectively adjacent to the second slits.

In other words, for pixels located in a same row, the slit widths of the slits in each pixel are equal, and the inter-slit distances in each pixel are also equal. As shown in FIG. 4, slit widths of all the slits in the pixels located in the first row are $D_1$ and inter-slit distances in the pixels located in the first row are $S_1$; slit widths of all the slits in the pixels located in the $n^{th}$ row are $D_n$, and inter-slit distances of the pixels in the $n^{th}$ row are $S_n$. From the first side to the second side, the slit width of the slits in at least one row of pixels close to the second side is greater than a slit width of slits in one row of pixels close to the first side, and an inter-slit distance between the slits of the at least one row of pixels close to the second side and the other slits that are respectively adjacent to the slits of the at least one row of pixels close to the second side is larger than an inter-slit distance between the slits in the one row of pixels close to the first side and the other slits that are respectively adjacent to the slits close to the first side. As shown in FIG. 4, the slit width of the slits in the $n^{th}$ row is larger than the slit width of the slits in the first row, i.e. $S_n > S_1$; the inter-slit distance between slits in the $n^{th}$ row is larger than the inter-slit distance between slits in the first row, i.e. $D_n > D_1$. As a result, at least for one row of pixels on the array substrate, a problem which includes a gradient increase in differences of the liquid crystal light efficiencies caused by a gradient decrease of temperature from the first side to the second side due to a position of the backlight source is compensated. Therefore, uniformity of image grayscale in the display apparatus is improved.

For example, slit widths of slits in pixels located in a same row are equal, and inter-slit distances between the slits and other slits which are respectively adjacent to the slits are equal. However, slit widths of slits in respective rows of pixels from the first side to the second side are increased sequentially from the first side to the second side, and respective inter-slit distances between the slits in the respective rows of pixels and other slits which are respectively adjacent to the slits in the respective rows of pixels are increased sequentially from the first side to the second side. As shown in FIG. 4, the slit widths are sequentially increased from the first row of pixels to the $n^{th}$ row of pixels, i.e. $S_1 < S_2 < \ldots < S_{n-1} < S_n$; and the inter-slit distances are increased sequentially from the first row of pixels to the $n^{th}$ row of pixels, i.e. $D_1 < D_2 < \ldots < D_{n-1} < D_n$. As a result, for each row of pixels on the array substrate, a problem which includes a gradient increase in differences of the liquid crystal light efficiencies caused by a gradient decrease of temperature from the first side to the second side due to a position of the backlight source is compensated. Therefore, uniformity of image grayscale in the display apparatus is improved.

For example, as shown in FIG. 7, at least two rows of pixels are formed as a group. For pixels located in a same group: slit widths of slits in each pixel are equal; and inter-slit distances between the slits of each pixel and other slits which are respectively adjacent to the slits are equal. Slit widths of first slits associated with pixels located in a first group that is close to the second side are greater than slit widths of second slits associated with pixels located in a second group that is close to the first side; and inter-slit distances between the first slits in the first group close to the second side and other slits that are respectively adjacent to the first slits are greater than inter-slit distances between the second slits in the second group close to the first side and other slits that are respectively adjacent to the second slits.

In FIG. 7, 3 rows of pixels are formed as a group. Of course, it is possible that one row of pixels is formed as a group or more rows of pixels are formed as a group. Slit widths of slits in respective pixels located in the same group are equal, and inter-slit distances in the respective pixels located in the same group are also equal. As shown in FIG. 7, with an example of the first group, the first group includes a first row, a second row and a third row. Slit widths in the first row of pixels are $D_1$, and inter-slit distances in the first row of pixels are $S_1$; slit widths in the second row of pixels are $D_2$ (not shown in FIG. 7), and inter-slit distances in the second row of pixels are $S_2$ (not shown in FIG. 7); slit widths in the third row of pixels are $D_3$ (not shown in FIG. 7), and inter-slit distances in the third row of pixels are $S_3$ (not shown in FIG. 7). The slit widths of the slits in respective pixels located in the same group are equal, and the inter-slit distances between the slits of the respective pixels and other slits which are respectively adjacent to the slits of the respective pixels are equal, i.e. $D_1=D_2=D_3$, $S_1=S_2=S_3$. The $k^{th}$ group of pixels includes the $(n-2)^{th}$ row, the $(n-1)^{th}$ row and the $n^{th}$ row, and then $D_{n-2}=D_{n-1}=D_n$, $S_{n-2}=S_{n-1}=S_n$. From the first side to the second side, slit widths of slits in at least one group of pixels close to the second side are greater than slit widths of slits in one group of pixels close to the first side, and inter-slit distances between the slits of the at least one group of pixels close to the second side and other slits adjacent to the slits of the at least one group of pixels are greater than inter-slit distances between the slits in the one group of pixels close to the first side and other slits adjacent to the slits of the one group of pixels close to the first side. As shown in FIG. 7, the slit widths of the slits in the $k^{th}$ group of pixels are larger than the slit widths of the slits in the first group of pixels, i.e. $S_{n-2}=S_{n-1}=S_n>S_1=S_2=S_3$; and the inter-slit distances in the $k^{th}$ group of pixels are larger than the inter-slit distances in the first group of pixels, i.e. $D_{n-2}=D_{n-1}=D_n>D_1=D_2=D_3$. As a result, for at least one group of pixels on the array substrate, a problem which includes a gradient increase in differences of the liquid crystal light efficiencies caused by a gradient decrease of temperature from the first side to the second side due to a position of the backlight source is compensated. Therefore, uniformity of image grayscale in the display apparatus is improved.

For example, pixels located in the same row correspond to a same single color, and multiple rows of pixels corresponding to different colors are formed as a group. As shown in FIG. 7, all the pixels located in the first row correspond to red (R), all the pixels located in a second row correspond to Green (G), and all the pixels located in a third row correspond to blue (B), and thus the first row of pixels, the second row of pixels and the third row of pixels are formed as a group. Alternatively, pixels located in the same group may correspond to the same color. For example, the first row, the second row and the third row are formed as a group, and all the pixels in the first row, the second row and the third row may correspond to red. Alternatively, each row of pixels located in the same group may correspond to different colors. As shown in FIG. 4, each row may correspond to three colors that include red (R), green (G) and blue (B), and the first row, the second row and the third row may form a group.

For example, at least two rows of pixels are formed as a group. For pixels located in a same group: slits of each pixel located in the same group have equal slit widths; and inter-slit distances between the slits of each pixel and other slits which are respectively adjacent to the slits are equal. However, slit widths of slits associated with pixels that are located in respective same groups from the first side to the second side are increased gradually from the first side to the second side; and inter-slit distances between the slits associated with the pixels that are located in the respective same groups and other slits which are respectively adjacent to the slits are increased gradually from the first side to the second side. As shown in FIG. 7, three rows of pixels are formed as a group. Slit widths and inter-slit distances from the first group to the k group are represented in an alphabetical order, respectively. Assume a slit width of an a group of pixels is $S_a$ and an inter-slit distance of the a group of pixels is D, then $S_1=S_2=S_3=S_a$, $D_1=D_2=D_3=D_a$. If the slit width of the k group of pixels is $S_k$ and the inter-slit distance of the k group of pixels is $D_k$, then $S_{n-2}=S_{n-1}=S_n=S_k$, $D_{n-2}=D_{n-1}=D_n=D_k$. From the first side to the second side, the slit widths of the slits in respective groups of pixels are sequentially increased, and the inter-slit distances between the slits in the respective groups of pixels and other slits which are respectively adjacent to the slits are sequentially increased, i.e. $S_a<S_b<\ldots<S_j<S_k$ and $D_a<D_b<\ldots<D_j<D_k$. As a result, for each group of pixels on the array substrate, a problem which includes a gradient increase in differences of the liquid crystal light efficiencies caused by a gradient decrease of temperature from the first side to the second side due to the backlight source is compensated. Therefore, uniformity of image grayscale in the display apparatus is improved.

Figure 10A:
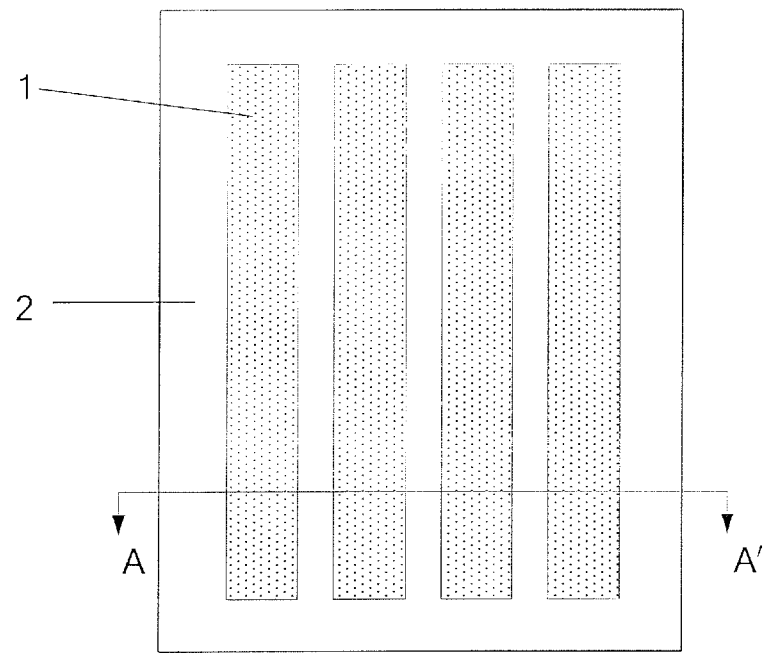
FIG. 10a is a schematic diagram of an array substrate which includes a second electrode formed on a substrate.

For example, as shown in FIG. 10a, the array substrate further includes a second electrode 2 formed on a substrate 3, and an insulation layer 4 can be disposed between a first electrode 1 and the second electrode 2. The second electrode 2 includes a plurality of pixel regions which have a one-to-one correspondence with pixels in the first electrode 1. Each pixel region is configured to include multiple slits. Slit widths of slits in a particular pixel region of the second electrode 2 correspond to slit widths of slits in a pixel of the first electrode that corresponds to the particular pixel region, and inter-slit distances between the slits in the particular pixel region and other slits that are respectively adjacent to the slits in the particular pixel region correspond to inter-slit distances between the slits in the corresponding pixel of the first electrode and other slits that are respectively adjacent to the slits of the corresponding pixel.

Figure 10B:
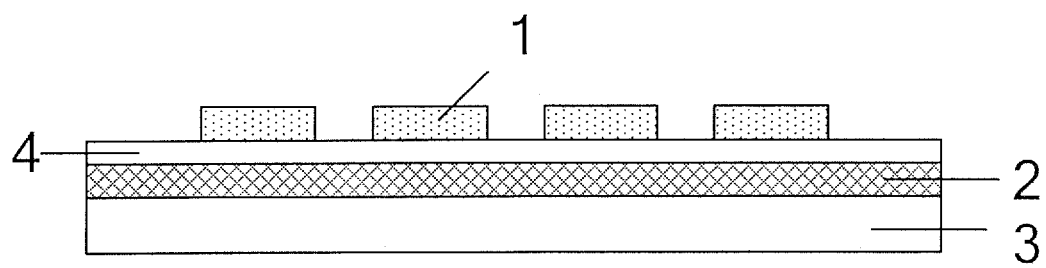

It should be noted that the liquid crystal display apparatus includes the first electrode 1 and the second electrode 2, and when voltages are loaded to the first electrode 1 and the second electrode 2 concurrently, the first electrode 1 and the second electrode 2 form an electrical field to drive the liquid crystal. If the second electrode 2 is configured to include multiple slits in each pixel region that corresponds to a respective pixel (e.g., the first electrode 1 and the second electrode 2 are both configured with multiple slits), the first electrode 1 and the second electrode 2 form an electrical field at the slits. For example, the second electrode 2 includes a plurality of pixel regions which correspond to the pixels of the first electrode 1 one by one, and each pixel region is configured to include multiple slits. It should be appreciated that the second electrode 2 can be a planar electrode as shown in FIG. 10b. The second electrode 2 can also include a plurality of second sub-electrodes which correspond to the pixels one by one, and each second sub-electrode may be referred to as a pixel region.

For example, the second electrode 2 includes a plurality of pixel regions that have a one-to-one correspondence with the pixels of the first electrode 1. Each pixel region is provided with multiple slits. Slit widths of the slits in the pixel region and inter-slit distances in the pixel region correspond to the slit widths of slits in a pixel corresponding to the pixel region and inter-slits distances in the corresponding pixel, respectively. Thus, the second electrode 2 configures its slit widths and its inter-slit distances to correspond to those of the first electrode 1 to compensate a problem which includes a gradient increase in differences of the liquid crystal light efficiencies caused by a gradient decrease of temperature from the first side to the second side due to the backlight source. Therefore, uniformity of image grayscale in the display apparatus is improved.

For example, slit widths of slits in a pixel region correspond to slit widths of slits of a pixel that corresponds to the pixel region, and inter-slit distances between slits of the pixel region and other slits adjacent to the slits of the pixel region correspond to inter-slit distances between the slits of the corresponding pixel and other slits adjacent to the slits of the corresponding pixel. For example, slits of the pixel region in the second electrode (including the slit widths and the inter-slit distances) are configured to match slits of the pixel that corresponds to the pixel region. It can be understand that, if: (1) slit widths of slits of a first pixel that is in the first electrode and close to the second side are larger than slit widths of slits of a second pixel that is in the first electrode and close to the first side, and (2) inter-slit distances between the slits of the first pixel and other slits adjacent to the slits of the first pixel are larger than inter-slit distances between the slits of the second pixel and other slits adjacent to the slits of the second pixel, then: (1) slit widths of slits of a first pixel region in the second electrode that corresponds to the first pixel of the first electrode and is close to the second side are larger than slit widths of slits of a second pixel region of the second electrode that corresponds to the second pixel of the first electrode and is close to the first side, and (2) inter-slit distances between the slits of the first pixel region and other slits adjacent to the slits of the first pixel region are larger than inter-slit distances between the slits of the second pixel region and other slits adjacent to the slits of the second pixel region. It should be noted that, a corresponding relationship exists between slits of the first electrode and slits of the second electrode, and the corresponding relationship is identical to a normal corresponding relationship. For example, a feasible corresponding relationship may include that projections of slits of the first electrode on a surface of the second electrode do not overlap with areas where slits of the second electrode are disposed.

It should be noted that the array substrate includes the first electrode and the second electrode. The first electrode can be arranged above the second electrode, or the first electrode can be arranged below the second electrode. The expression of "above" and "below" in embodiments of the disclosure can be interpreted according to the sequence in a manufacture process of the array substrate. For example, an "above" pattern refers to a pattern that is formed later, and a "below" pattern refers to a pattern that is formed earlier. A pixel electrode is located above a common electrode, which indicates that the common electrode is formed on the substrate first, and later the pixel electrode is formed on the substrate.

Figure 9:
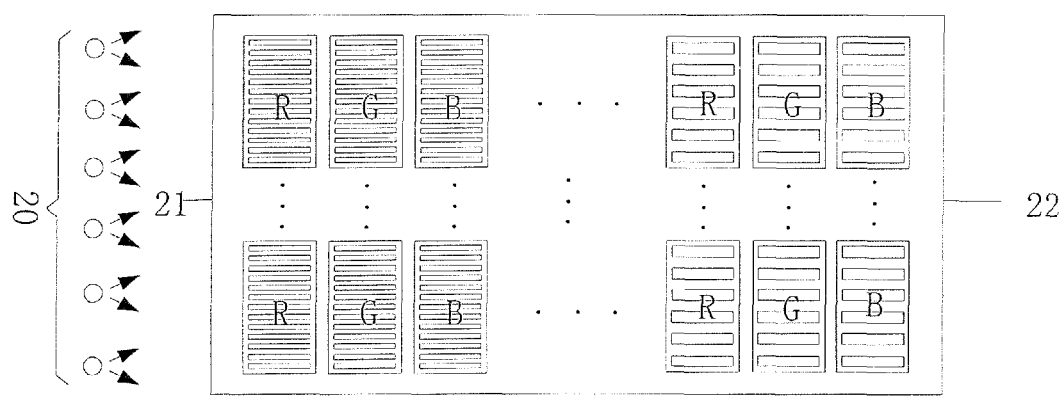
FIG. 9 is a schematic diagram of another display apparatus provided in an embodiment of the disclosure.

An embodiment of the disclosure further provides a display apparatus, which includes a backlight source and any of the array substrates provided in embodiments of the disclosure. As shown in FIGS. 8 and 9, for example, the display apparatus shown in FIG. 8 includes the array substrate shown in FIG. 4, and the display apparatus shown in FIG. 9 includes the array substrate shown in FIG. 7. The backlight source 20 is located in a position close to the first side 21 of the array substrate. A slit width of at least one slit that is close to the second side is greater than a slit width of a first slit that is close to the first side, and an inter-slit distance between the at least one slit close to the second side and another slit that is adjacent to the at least one slit is greater than an inter-slit distance between the first slit close to the first side and another slit that is adjacent to the first slit. As a result, a problem which includes a gradient increase in differences of the liquid crystal light efficiencies caused by a gradient decrease of temperature from the first side to the second side due to the backlight source is compensated. Therefore, uniformity of image grayscale in the display apparatus is improved. It can be appreciated that the display apparatus includes backlight sources which are arranged symmetrically. Correspondingly, the array substrate can include symmetrical first sides and symmetrical second sides, which is not described here.

Embodiments of the disclosure provide an array substrate and a liquid crystal display apparatus. The array substrate includes a first side and a second side which are opposite to each other. A plurality of pixels is included from the first side to the second side, and each pixel is configured with multiple slits. A slit width of at least one slit that is close to the second side is greater than a slit width of a first slit that is close to the first side. An inter-slit distance between the at least one slit close to the second side and another slit that is adjacent to the at least one slit is greater than an inter-slit distance between the first slit close to the first side and another slit that is adjacent to the first slit. That is, when a backlight source is disposed on a position near the first side, a slit width of a slit close to a first area on the first side (e.g., the first area having a high temperature) is small as well as an-inter distance between the slit close to the first area and another slit adjacent to the slit close to the first area; however, a slit width of a slit close to a second area on the second side (e.g., the second area having a low temperature) is large as well as an-inter distance between the slit close to the second area and another slit adjacent to the slit close to the second area. And, a larger slit width for the slit and a larger inter-slit distance between the slit and anther slit adjacent to the slit may lead to a smaller transmissivity. As a result, a problem that includes a gradient increase in difference of the liquid crystal light efficiencies caused by a gradient decrease of temperature from the first side to the second side due to a location of the backlight source is compensated. For example, the transmissivity of the array substrate itself is changed directionally to improve uniformity of image grayscale in the display apparatus.

The array substrate and the display apparatus provided in the disclosure solve the technical problem that the grayscale of the display panel is non-uniform in different positions from a side close to the backlight source to a side far from the backlight source due to temperature variations caused by the backlight source.

What are described above is related to the illustrative embodiments of the disclosure only and not limitative to the scope of the disclosure; the scopes of the disclosure are defined by the accompanying claims.

This application claims the priority of Chinese Patent Application No. 201410455895.8 filed on Sep. 9, 2014, which is incorporated herein by reference in its entirety.

The invention claimed is:
1. An array substrate, comprising:
   a substrate; and
   a first electrode formed on the substrate,
   wherein:
      the array substrate comprises a first side and a second side that is opposite to the first side;
      the first electrode includes a plurality of pixels and each pixel is configured to include a plurality of slits;
      a slit width of at least one slit that is close to the second side is greater than a slit width of a first slit that is close to the first side; and
      an inter-slit distance between the at least one slit close to the second side and another slit that is adjacent to the at least one slit is greater than an inter-slit distance between the first slit close to the first side and another slit that is adjacent to the first slit;
      wherein for each slit in the plurality of pixels, a ratio of slit width associated with the respective slit and an inter-slit distance between the respective slit and another slit that is adjacent to the respective slit is a constant.
2. The array substrate of claim 1, wherein the plurality of pixels is arranged in multiple rows from the first side to the second side.
3. The array substrate of claim 2, wherein pixels located in a same row correspond to at least three different colors.
4. The array substrate of claim 3, wherein for each pixel located in a same row:
   slit widths of slits in the respective pixel are increased gradually from the first side to the second side; and
   inter-slit distances between the slits in the respective pixel and other slits that are respectively adjacent to the slits in the respective pixel are increased gradually from the first side to the second side.
5. The array substrate of claim 3, wherein:
   slits of each pixel located in a same row have equal slit widths;
   inter-slit distances between the slits of each pixel in the same row and other slits which are respectively adjacent to the slits of the respective pixel are equal;
   slit widths of first slits associated with pixels that are located in a first row close to the second side are greater than slit widths of second slits associated with pixels that are located in a second row close to the first side; and
   inter-slit distances between the first slits located in the first row close to the second side and other slits that are respectively adjacent to the first slits are greater than inter-slit distances between the second slits located in the second row close to the first side and other slits that are respectively adjacent to the second slits.
6. The array substrate of claim 3, wherein:
   slits of each pixel located in a same row have equal slit widths;
   inter-slit distances between the slits of each pixel in the same row and other slits which are respectively adjacent to the slits of the respective pixel are equal;
   slit widths of slits associated with pixels that are located in respective same rows from the first side to the second side are increased gradually from the first side to the second side; and
   inter-slit distances between the slits associated with the pixels that are located in the respective same rows and other slits which are respectively adjacent to the slits associated with the respective pixels are increased gradually from the first side to the second side.
7. The array substrate of claim 2, wherein for each pixel located in a same row:
   slit widths of slits in the respective pixel are increased gradually from the first side to the second side; and
   inter-slit distances between the slits in the respective pixel and other slits that are respectively adjacent to the slits in the respective pixel are increased gradually from the first side to the second side.
8. The array substrate of claim 7, further comprising a second electrode formed on the substrate, wherein:
   the second electrode comprises a plurality of pixel regions that have a one-to-one correspondence with the plurality of pixels in the first electrode and each pixel region is configured to include multiple slits;
   slit widths of slits in a pixel region of the second electrode correspond to slit widths of slits in a pixel of the first electrode that corresponds to the pixel region; and
   inter-slit distances between the slits in the pixel region and other slits that are respectively adjacent to the slits in the pixel region correspond to inter-slit distances between the slits in the pixel of the first electrode and other slits that are respectively adjacent to the slits of the pixel.
9. The array substrate of claim 2, wherein:
   slits of each pixel located in a same row have equal slit widths;
   inter-slit distances between the slits of each pixel in the same row and other slits which are respectively adjacent to the slits of the respective pixel are equal;
   slit widths of first slits associated with pixels that are located in a first row close to the second side are greater than slit widths of second slits associated with pixels that are located in a second row close to the first side; and
   inter-slit distances between the first slits located in the first row close to the second side and other slits that are respectively adjacent to the first slits are greater than inter-slit distances between the second slits located in the second row close to the first side and other slits that are respectively adjacent to the second slits.
10. The array substrate of claim 2, wherein:
    slits of each pixel located in a same row have equal slit widths;
    inter-slit distances between the slits of each pixel in the same row and other slits which are respectively adjacent to the slits of the respective pixel are equal;
    slit widths of slits associated with pixels that are located in respective same rows from the first side to the second side are increased gradually from the first side to the second side; and
    inter-slit distances between the slits associated with the pixels that are located in the respective same rows and other slits which are respectively adjacent to the slits associated with the respective pixels are increased gradually from the first side to the second side.
11. The array substrate of claim 10, further comprising a second electrode formed on the substrate, wherein:
    the second electrode comprises a plurality of pixel regions that have a one-to-one correspondence with the plurality of pixels in the first electrode and each pixel region is configured to include multiple slits;
    slit widths of slits in a pixel region of the second electrode correspond to slit widths of slits in a pixel of the first electrode that corresponds to the pixel region; and
    inter-slit distances between the slits in the pixel region and other slits that are respectively adjacent to the slits in the pixel region correspond to inter-slit distances between the slits in the pixel of the first electrode and other slits that are respectively adjacent to the slits of the pixel.

12. The array substrate of claim 2, wherein:
pixels in at least two rows form a group;
slits of each pixel located in a same group have equal slit widths;
inter-slit distances between the slits of each pixel in the same group and other slits which are respectively adjacent to the slits of the respective pixel are equal;
slit widths of first slits associated with pixels that are located in a first group close to the second side are greater than slit widths of second slits associated with pixels that are located in a second group close to the first side; and
inter-slit distances between the first slits in the first group and other slits that are respectively adjacent to the first slits are greater than inter-slit distances between the second slits in the second group and other slits that are respectively adjacent to the second slits.

13. The array substrate of claim 12, wherein each pixel located in a same row corresponds to a same color, and pixels located in multiple rows that correspond to different colors form a group.

14. The array substrate of claim 2, wherein:
pixels in at least two rows form a group;
slits of each pixel located in a same group have equal slit widths;
inter-slit distances between the slits of each pixel in the same group and other slits which are respectively adjacent to the slits of the respective pixel are equal;
slit widths of slits associated with pixels that are located in respective same groups from the first side to the second side are increased gradually from the first side to the second side; and
inter-slit distances between the slits associated with the pixels that are located in the respective same groups and other slits which are respectively adjacent to the slits associated with the respective pixels are increased gradually from the first side to the second side.

15. The array substrate of claim 14, wherein each pixel located in a same row corresponds to a same color, and pixels located in multiple rows that correspond to different colors form a group.

16. The array substrate of claim 1, further comprising a second electrode formed on the substrate, wherein:
the second electrode comprises a plurality of pixel regions that have a one-to-one correspondence with the plurality of pixels in the first electrode and each pixel region is configured to include multiple slits;
slit widths of slits in a pixel region of the second electrode correspond to slit widths of slits in a pixel of the first electrode that corresponds to the pixel region; and
inter-slit distances between the slits in the pixel region and other slits that are respectively adjacent to the slits in the pixel region correspond to inter-slit distances between the slits in the pixel of the first electrode and other slits that are respectively adjacent to the slits of the pixel.

17. A liquid crystal display apparatus, comprising a backlight source and the array substrate of claim 1, wherein the backlight source is arranged at a position close to the first side of the array substrate.

18. The array substrate of claim 1, wherein the plurality of pixels is arranged in multiple rows from the first side to the second side.

19. The array substrate of claim 1, further comprising a second electrode formed on the substrate, wherein:
the second electrode comprises a plurality of pixel regions that have a one-to-one correspondence with the plurality of pixels in the first electrode and each pixel region is configured to include multiple slits;
slit widths of slits in a pixel region of the second electrode correspond to slit widths of slits in a pixel of the first electrode that corresponds to the pixel region; and
inter-slit distances between the slits in the pixel region and other slits that are respectively adjacent to the slits in the pixel region correspond to inter-slit distances between the slits in the pixel of the first electrode and other slits that are respectively adjacent to the slits of the pixel.

* * * * *